July 18, 1950 A. MATHEIS 2,515,460
FLOW REGULATOR FOR GREASE INTERCEPTORS AND THE LIKE
Filed April 10, 1946 2 Sheets-Sheet 1
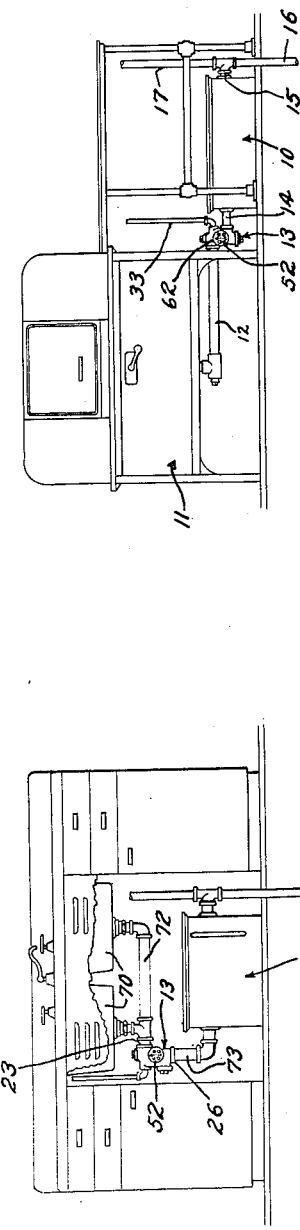
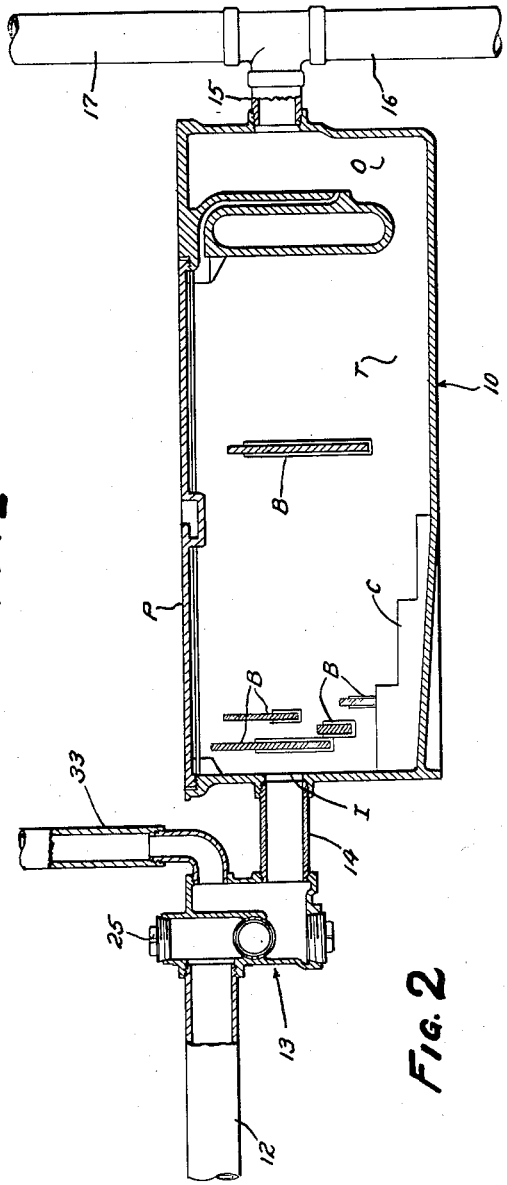
INVENTOR.
AARON MATHEIS.
BY
ATTORNEYS

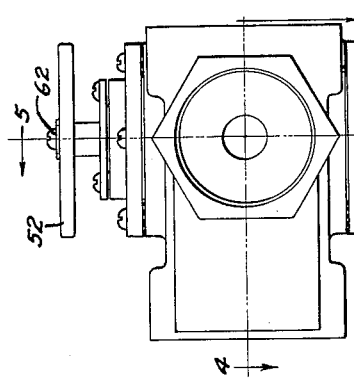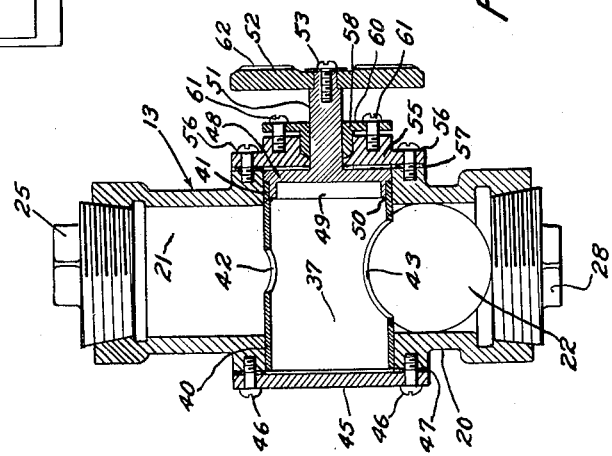

Patented July 18, 1950

2,515,460

UNITED STATES PATENT OFFICE 2,515,460

FLOW REGULATOR FOR GREASE INTERCEPTORS AND THE LIKE

Aaron Matheis, Michigan City, Ind., assignor to Josam Manufacturing Company, Cleveland, Ohio, a corporation of Delaware Application April 10, 1946, Serial No. 661,162

2 Claims. (Cl. 138—46)

The present invention relates to an improved flow regulator with vented orifice for grease interceptors or the like.

An object of the invention is to provide a regulator adapted to be installed ahead of the inlet of a grease interceptor or the like, for restricting the flow of waste liquid to the interceptor, which regulator is arranged to minimize clogging thereof, and which, if clogged, may be flushed or cleared of the clogging material by manipulating a control member of the exterior thereof.

Another object of the invention is to provide a regulator of the character described which may be flushed to free the same of clogging material, but which flushing will not appreciably increase the flow to the grease interceptor above normal.

Still another object of the invention is to provide a flow regulator for a grease interceptor which may be connected in the drain line leading to the interceptor by alternate connections and the control member may be disposed on one side or the other of the regulator whereby the regulator may be installed in the most convenient position afforded by the various conditions likely to be encountered.

Other objects and advantages of the invention will be apparent from the following description of a preferred form of embodiment of the invention, reference being made to the accompanying drawings wherein:

Fig. 1 is a view in elevation of a dishwashing apparatus showing a grease interceptor in the drain line thereof, a flow regulator being connected in the drain line between the washer and the interceptor;

Fig. 2 is a longitudinal view in section of the flow regulator and the grease interceptor shown in Fig. 1;

Fig. 3 is a top plan view of the flow regulator, shown in Figs. 1 and 2;

Fig. 4 is a view in section taken on line 4—4 of Fig. 3;

Fig. 5 is a view in section taken on line 5—5 of Fig. 3;

Fig. 6 is a fragmentary view similar to that of Fig. 4, but showing certain parts of the regulator in a different position; and Fig. 7 is a view in elevation of a sink having a grease interceptor connected with the drain line of the sink, my improved regulator being shown in the drain line intermediate the sink and interceptor. Part of the sink is shown broken away for the sake of clarity.

It is generally the practice to place a flow regulator in the waste line from a sink or other fixture or equipment to a grease interceptor to restrict the flow of waste water to the interceptor to a rate within the capacity of the interceptor. Frequently, solids in the waste liquid collect at the regulator and eventually clog the latter. In the usual type regulators, the clogging material must be removed through an opening in the regulator casing, which opening is normally closed by a plate. This cleaning operation is unhandy and waste water often escapes through the cleanout opening and causes considerable inconvenience. In the present invention, the regulator comprises a casing forming a liquid passage therethrough and a sleeve is rotatively mounted in the casing and extends laterally of the passage. Preferably, the casing is mounted so that the passage extends vertical at the point where the sleeve intersects the same. The sides of the sleeve engage walls of the casing for forming a liquid seal between the sleeve walls and the casing walls, and the sleeve is provided with two openings in the wall thereof, the openings being in opposite sides of the sleeve and in alignment with the passage. One of the openings is substantially smaller than the other and is normally positioned facing upwardly. The other opening in the sleeve is the same size as the passage in the casing and it normally faces downwardly. The smaller opening restricts the flow through the passage to that within the capacity of the interceptor. When material collects above the sleeve and interferes with the flow through the regulator, the sleeve may be rotated 180 degrees by a suitable control knob on the exterior of the regulator casing so that the positions of the two openings are reversed. This allows the clogging material to enter the sleeve, which has considerable volume, and the sleeve is again rotated 180 degrees to reestablish the normal positions of the openings. This permits the material in the sleeve to pass on to the interceptor through the larger opening. The smaller opening substantially at all times controls the flow of liquid through the passage so that the interceptor will not be overloaded during cleaning of the regulator casing.

Referring more particularly to the drawings, in Fig. 1 I have shown a typical installation of a grease interceptor 10 with a dishwashing apparatus 11. The dishwasher drains into a drain line comprising pipe 12, a flow regulator 13 and a pipe 14 which interconnects the regulators 13 with the inlet of the interceptor 10. The interceptor may be of any suitable design, and in Fig. 2 it is illustrated as comprising a tank T having a cascade bottom C and a plurality of laterally disposed baffles B. Waste water enters the tank at I and the outlet of the tank is a vertical conduit O which leads from the bottom of the tank upwardly to the outlet connection 15. A plate P closes the top of the tank. The grease and oil in the water fed to the interceptor rise to the surface in the tank and the clarified water passes from the lower part of the tank to the outlet 15 and to the sewer, all of which is well understood in the art. The outlet 15 of the interceptor is connected with the city sewer system by a pipe 16. A ventilation pipe 17 leads from the sewer pipe 16 to a suitable flue, not shown.

The capacity of the interceptor to separate the grease and oil from the waste water is limited, and a too rapid flow into the interceptor will adversely affect the operation of the interceptor. For this reason, the regulator 13 is placed in the drain line for restricting the flow to the interceptor.

The regulator 13 comprises a casing 20, which is preferably cast of iron, or any other suitable metal. The casing 20 includes an upper cavity 21 and a lower cavity 22 which are interconnected by an opening to form a vertical liquid passage. The upper portion of the casing 20 has two inlet openings 23 and 24 arranged with the axis thereof at right angles to one another. The casing at openings 23 and 24 is threaded for connection with a drain pipe and the other one may be plugged or capped as desired. In the form shown in Fig. 1, pipe 12 is threaded into the casing at opening 23 and a cap 25 is threaded into opening 24 for closing the same. It is to be understood, however, that opening 23 could be closed by the threaded plug 25 and opening 24 connected with a drain pipe, if it was desirable to connect the regulator to a vertical pipe.

The lower portion of the casing is provided with two outlet openings 26 and 27, which are disposed with the axes thereof at right angles to one another, and the casing about these openings are threaded for receiving pipes or plugs, as desired. In the present form, pipe 14 is threaded into the casing at 27 and a plug 28 is threaded into the casing to close opening 26. Preferably, the passage from the cavities 21 to 22 is vertical, and by providing the two inlets and two outlets as described, the casing may be attached to either vertically or horizontally extending drain pipes as required for disposing the casing in the preferred position.

The casing 20 is also formed to provide a vertically extending portion 30 of cavity 22 and an opening 31 is formed in the casing at the top of portion 30. A nipple or elbow joint 32 is threaded into the opening and it is also connected to a vent tube 33, which tube leads to the exterior of the building.

The casing 20 is provided with inwardly extending wall portions 35 and 36 intermediate the upper and lower cavities 21 and 22. The confronting surfaces of the wall portions are semicylindrical for receiving a sleeve 37 therebetween. The sleeve 37 is disposed with its axis transversely of the passage between the cavities 21 and 22, and the outside thereof frictionally engages the wall portions 35 and 36 for forming a liquid seal between the casing and sleeve. The sleeve is preferably formed of a relatively thin walled tube, such as brass or copper, for example, and the ends of the tube are journalled in aligned circular openings 40 and 41 formed in opposite walls of the casing. The sleeve may be inserted in the casing through either of the openings 40 or 41. An opening is formed in one side of the sleeve, the area of the opening being such as to admit a flow of liquid at the maximum desired rate. A second circular opening 43 is formed in the sleeve diametrically opposite the opening 42, and the opening 43 is substantially larger in area than opening 42. The diameter of opening 43, however, is preferably the same size as the diameter of the sleeve 37.

The opening 40 is closed by a plate 45 secured to the casing by screws 46. A gasket 47 is interposed between the plate and casing to form a liquid-tight seal.

The sleeve 37 has a stem member attached in one end thereof for rotation of the sleeve. The stem member includes a flanged circular portion 48 which has a circular flange 49 that extends into the end of the sleeve and is brazed to the sleeve as at 50. A stem 51 extends from portion 48 and a suitable knob 52 is adapted to be attached to the stem by a screw 53. The opening 41 is closed by a plate 55 that is attached to the casing 20 by screws 56, and a gasket 57 is interposed between the plate and casing. The stem 51 extends through an opening in the plate 55 and a resilient packing element 58, such as rubber or the like, surrounds the stem and is compressed to form a liquid-tight seal between the stem and the walls of the opening through which the stems extends by a plate 60. The plate 60 has a central opening through which the stem 51 extends and it is pressed against the packing element 58 by screws 61. It is apparent that the sleeve 37 can be rotated through 360 degrees by the knob 52, and preferably, the knob has a suitable indicia thereon for indicating the position of the sleeve. The indicia may be in the form of an arrow 62 formed on the face of the knob.

Preferably the openings 40 and 41 are the same dimensions and the threaded openings for the securing screws 46 are spaced similarly to the openings for receiving screws 56 so that plates 45 and 55 may be attached to either side of the casing 20. Thus, the knob 52 can be mounted on either side of the casing as desired for convenient access thereto.

The sleeve 37 is normally positioned with the opening 42 in the position shown in Fig. 4 so that it will restrict the flow of waste water downwardly through the casing. Solid waste materials too large to pass through the opening 42 will collect over the upper surfaces of wall portions 35 and 36 and on the sleeve adjacent the opening 42. When a quantity of material collects that tends to block the flow through opening 42, the material may be cleared from the regulator by rotating sleeve 37 through 180 degrees so that the positions of the openings 42 and 43 are reversed, as shown in Fig. 6. The solids will enter the sleeve 37 through opening 43. The sleeve is then rotated through another 180 degrees to the position shown in Fig. 4 and the solids then pass from the sleeve through the opening 43 and are carried to the interceptor. It will be apparent that the orifice 42 will be effective to restrict the flow of liquid through the regulator while the orifice 43 is in the upward position so that there will always be a controlled flow of liquid to the interceptor, and at no time will the flow be excessive.

In Fig. 7 I have shown the regulator 13 mounted in the drain line of two sinks 70 for regulating the flow of drain water to an interceptor 71, which interceptor may be similar to the interceptor 10. In this instance, drain pipe 72 is connected with the sink drains and directs water into the inlet 23 of the regulator. A pipe 73 is connected at one end to the outlet opening 26 of the regulator and the other end is connected to the inlet of the interceptor. In this instance, the knob 52 is mounted on the opposite side of the casing 20 than that shown in Figs. 1, 3 and 5 for more convenient access thereto, and the outlet 26 is used instead of outlet 27 to permit the regulator to be mounted above the interceptor. The outlet 27 is covered by plug 28. Thus, it is apparent that the regulator is constructed to provide flexibility in the selection of the position in which it may be installed.

By my invention I have provided a flow regulator that can be quickly flushed or cleared of clogging materials by manipulating an externally located member and during such clearing operation, the flow of liquid to the interceptor is maintained within the desired restrictions. Also, by the provision of the plurality of inlets and outlets and the reversibility of the sleeve actuating member with respect to its location on the sides of the regulator casing, the regulator can be readily installed in the most convenient locations.

1. A flow regulator for a grease interceptor comprising, a casing having a liquid passage therethrough; a hollow sleeve in said casing extending transversely of said passage, said casing having openings through opposite walls thereof in which the ends of said sleeve are journalled, the diameters of said openings and sleeve being such that the position of the sleeve may be reversed in the casing, said sleeve having openings in opposite walls thereof and in alignment with said passage and having a stem extending from one end thereof for rotating the sleeve about its axis; a plate for closing said openings in the casing, means for attaching said plate to the casing over either of said openings in the casing; a plate having an opening therein, the last mentioned plate being adapted to be attached over either of said openings in the casing and receiving said stem through the opening therein; and means for attaching the last mentioned plate to said casing over either of said openings in the casing.

2. A flow regulator for a grease interceptor comprising, a casing having an upper and a lower cavity interconnected by a vertical passage, said upper cavity having two inlets, the axes of which inlets are disposed at right angles to one another, and said lower cavity having two outlets, the axes of which are disposed at right angles to one another; a hollow sleeve in said casing extending transversely of said passage, said casing having openings through opposite walls thereof in which the ends of said sleeve are journalled, the diameters of said openings and sleeve being such that the position of the sleeve may be reversed in the casing, said sleeve having openings in opposite walls thereof and in alignment with said passage and having a stem extending from one end thereof for rotating the sleeve about its axis; a plate for closing said openings in the casing, means for attaching said plate to the casing over either of said openings in the casing; a plate having an opening therein, the last mentioned plate being adapted to be attached over either of said openings in the casing and receiving said stem through the opening therein; and means for attaching the last mentioned plate to said casing over either of said openings in the casing.

AARON MATHEIS.

REFERENCES CITED

The following references are of record in the file of this patent:

UNITED STATES PATENTS

| Number | Name | Date |
| --- | --- | --- |
| 400,275 | Vogel | Mar. 26, 1889 |
| 2,018,034 | Roberts | Oct. 22, 1935 |

FOREIGN PATENTS

| Number | Country | Date |
| --- | --- | --- |
| 6,103 | Great Britain | Mar. 16, 1903 |